United States Patent
Gehring

(10) Patent No.: US 6,839,133 B2
(45) Date of Patent: Jan. 4, 2005

(54) OPTO-ELECTRONIC SENSOR

(75) Inventor: Roland Gehring, Elzach-Prechtal (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/397,677

(22) Filed: Mar. 25, 2003

(65) Prior Publication Data

US 2003/0184737 A1 Oct. 2, 2003

(30) Foreign Application Priority Data

Mar. 27, 2002 (DE) .......................... 102 13 843

(51) Int. Cl.⁷ .............................. G01B 11/26; G01C 1/00
(52) U.S. Cl. ................................ 356/141.1; 356/141.4; 356/141.5
(58) Field of Search ........................ 356/139.03, 141.1, 356/141.3, 141.4, 141.5

(56) References Cited

U.S. PATENT DOCUMENTS

| 5,506,644 | A |   | 4/1996 | Suzuki et al. |
| 5,644,386 | A | * | 7/1997 | Jenkins et al. ............. 356/4.01 |
| 5,799,082 | A |   | 8/1998 | Murphy et al. |
| 6,433,866 | B1 | * | 8/2002 | Nichols ................... 356/141.1 |
| 6,480,270 | B1 | * | 11/2002 | Studnicka et al. ....... 356/141.1 |

FOREIGN PATENT DOCUMENTS

| DE | 4210245 C2 | 9/1993 |
| DE | 69117858 T2 | 10/1996 |
| DE | 10016688 A1 | 10/2001 |
| DE | 10130665 A1 | 1/2003 |
| EP | 0462905 B1 | 1/1997 |
| EP | 0855835 A2 | 7/1998 |
| EP | 1189021 A1 | 3/2002 |
| WO | WO 99/13355 A1 | 3/1999 |
| WO | WO 99/18432 A1 | 4/1999 |

* cited by examiner

Primary Examiner—Bernarr E. Gregory
Assistant Examiner—Brian Andrea
(74) Attorney, Agent, or Firm—Townsend and Townsend and Crew LLP

(57) ABSTRACT

An opto-electronic sensor for the optical detection of objects in a monitored zone. The sensor is coupled to a position measuring device for the production of at least one position detection signal and to an evaluation and control device for the calculation of an actual spatial position, alignment and/or angular position of the sensor using the position detection signal.

30 Claims, 2 Drawing Sheets

OPTO-ELECTRONIC SENSOR

BACKGROUND OF THE INVENTION

The invention relates to an optoelectronic sensor for the optical detection of an object within a monitored zone. Such a sensor typically has a light transmitter for the transmission of a transmitted light beam as well as a light receiver for the generation of received light signals in dependence on an incidence of light. This incidence of light changes depending on the presence or on the position of an object in the monitored zone. An evaluation and control device can thus detect the presence or position of the object by an evaluation of the received light signals in order, for example, to produce a corresponding object detection signal.

Such an object can be an article, for example a piece of baggage or a shipped package on a conveyor belt, or a marking applied to an article, for example a barcode or a two-dimensional optical code.

For some applications of such sensors, an undesirably complex measurement of the position of the sensor with respect to the monitored zone or with respect to the objects to be detected located therein is necessary.

SUMMARY OF THE INVENTION

It is therefore an object of the invention to simplify and to improve a correct detection of objects and a correct association of object detection signals with the objects in question.

This object is satisfied for a sensor of the kind initially named in that the sensor is coupled to a position measuring device for the production of at least one position detection signal as well as to an evaluation and control device for the calculation of an actual spatial position, alignment and/or angular position of the sensor using the position detection signal.

The sensor in accordance with the invention is therefore equipped with a position measuring device which determines or receives one or more position detection signals and transmits them to an evaluation and control device. The latter calculates a spatial position of the sensor—for example in X, Y, Z coordinates—, an angular alignment of the sensor — for example within a predetermined plane, in particular the horizontal plane—, or an angular position of the sensor—for example relative to a predetermined plane, in particular the horizontal plane—, from the position detection signals. The position or location of the sensor can be determined in absolute coordinates—that is, with respect to universal reference points or in relative coordinates—that is, with respect to a local reference point.

The spatial position, alignment or angular position of the sensor thus calculated can be linked to an object detection signal which is determined in connection with the actual detection function of the sensor. In this manner, a correct spatial association can be established between this object detection signal and the corresponding object such that the object detection signal is not accidentally associated with an incorrect object. It can thus, for example, reliably be avoided that a shipped package transported on a transport belt is sorted out even though a barcode corresponding to this sorting out is not identified on this shipped package, but on a further shipped package.

The sensor in accordance with the invention can be connected to the position measuring device directly or indirectly, for example via the evaluation and control device.

A substantial advantage of the invention accordingly lies in the fact that, for the installation or the ongoing operation of a sensor, its spatial position, or angular position, can be determined in a simple manner and can be used as a basis for the sensor operation without the user having to make unwanted complex measuring or adjustment measures. Following applications are, for example, possible:

(a) If a sensor in accordance with the invention is arranged with a barcode reader in a stationary manner in an omni-directional reading station, a read-in barcode can unambiguously be associated with one of a possible plurality of objects in the monitored zone on the basis of the determined spatial position, alignment and angular position of the sensor without a complex measurement of the barcode reader and of the monitored zone as well as a corresponding parameterization of the sensor being required.

(b) For a mobile arrangement of the sensor, a driver-less transport system can, for example, be provided which is equipped with a laser scanner which, for orientation, constantly scans its actual environment and thereby determines distance information. In such an application, the coupling of the laser scanner to the position measuring device and the corresponding calculation of the actual spatial position of the transport system can support its control to avoid incorrect guidings.

(c) Applications are also possible in which volumetric measurements are carried out at objects, for example by means of a laser scanner. For a correct calculation of a measured volume, the spatial position and the angular position of the laser scanner must be known. This information can be obtained in the sensor in accordance with the invention in a simple and reliable manner.

A particular advantage of the sensor in accordance with the invention lies in the fact that the sensor can quickly be reconfigured for different applications or positions—even if it is only provided for a stationary operational arrangement—since the new spatial position or angular position can be determined for the subsequent operation simply by pressing a button or automatically in order to be used as the basis for the further sensor control and signal evaluation.

A position signal receiver can, for example, be provided as the position measuring device of the sensor in accordance with the invention and is formed for the reception of reference signals of a satellite-aided position signal transmission system. Such a position signal receiver transmits the reference signals—for example after a signal amplification—to the evaluation and control device as position detection signals. The satellite-aided position signal transmission system can, for example, be the global positioning system (GPS) or the future Galileo satellite navigation system. Such systems continuously transmit radio signals via a network of satellites. A position or location value can be calculated—in a known manner—from the temporal association of these reference signals.

An advantage of the utilization of such a satellite-aided position signal transmission system lies in the fact that the position signal transmitters and the reference signals transmitted by these are available globally and at no cost. With the exception of the equipping of the sensor with the position signal receivers and with the evaluation and control device, no additional measures thus have to be taken to be able to determine the position of the sensor at any desired point of operation using the reference signals which can be received there.

In accordance with another advantageous embodiment, a position signal receiver is provided as the position measuring device and receives the reference signals which are transmitted by at least one local position signal transmitter, that is, a position signal transmitter installed in the environment of the opto-electronic sensor. These reference signals are converted into position detection signals, for example by filtering and amplification. In a similar manner as in the utilization of a satellite-aided position signal transmission system explained above, one or more local position signal transmitters can therefore be installed which transmit reference signals continuously or on call which can be received by the position signal receiver. The position signal transmitters thus serve as reference points with respect to which a relative position, alignment or angular position of the sensor can be calculated using the received reference signals.

An advantage of the use of such local position signal transmitters in connection with a position signal receiver coupled to the sensor lies in the fact that a very high precision can be achieved with respect to the spatial position, alignment or angular position to be determined, in particular in comparison with the evaluation of reference signal data of a satellite-aided position signal transmission system.

The reference signals transmitted by the position signal transmitters can be radio signals. The determination of the sensor position using the received reference signals can take place according to the principle of a radio beacon. It is preferred for the local position signal transmission system to encode and transmit the reference signals in the same form as in connection with satellite-aided position signal transmission systems.

It is in particular of advantage for the position signal receiver to be suitable for the reception of reference signals of both a satellite-aided position signal transmission system and of a local position signal transmitter. The possibility of a particularly precise position determination is thereby linked to an independence of local position signal transmitters and an independence of the local reception conditions of satellite-aided position signal transmitters.

With respect to the explained embodiment using local position signal transmitters, the invention also relates to an opto-electronic sensor system which has at least one local position transmitter of this kind as well as an opto-electronic sensor which is coupled to a position signal receiver of this kind for the reception of reference signals of the local position signal transmitter.

The position measuring device of the sensor in accordance with the invention can, in accordance with a further advantageous embodiment, have an alignment sensor, in particular a gyroscopic sensor, for example a gyroscopic compass, which produces at least one position detection signal which corresponds to an actual alignment of the sensor within a predetermined plane, for example, the horizontal plane.

In accordance with a further advantageous embodiment, an inclination sensor is provided as the position measuring device and produces a position detection signal by means of which the evaluation and control device can calculate an actual angular position of the sensor with respect to the vertical, to the horizontal or to any other reference line or reference plane. The inclination sensor can, for example as a so-called static acceleration sensor, have a semi-conductor component or it can be designed in accordance with the principle of an integrated spirit level.

It must be noted with respect to the explained embodiments of the position measuring device that these can be combined in any desired manner. For example, in addition to a position signal receiver for the reception of reference signals of a satellite-aided position signal transmission system, a gyroscopic sensor can be provided so that a plurality of position detection signals can be produced from which the actual spatial position and the actual alignment of the sensor in space can be determined. It is also possible, for example, to couple both a position signal receiver for the reception of reference signals of a local position signal transmitter and an inclination sensor to the opto-electronic sensor in order to be able to calculate an actual spatial position and an actual angular position of the sensor using the respective position detection signals. The gyroscopic sensor and the inclination sensor can also be jointly integrated into an optoelectronic sensor, with or without a position signal receiver.

The determination of an actual spatial position, alignment or angular position of the sensor, that is, the calculation of this information using a separate position signal or the last received position signal, can be triggered by means of the evaluation and control device, for example, on the basis of a trigger command entered by the user. For this purpose, the sensor can be equipped with a trigger switch which is optionally actuated by the user.

The determination of an actual spatial position or angular position can also be initiated by the evaluation and control device, for example, on the basis of taking the sensor into operation, and indeed on the basis of a first taking into operation by the user or on the basis of a repeat taking into operation, for example after a change of position or after a reconfiguring of the sensor.

Furthermore, the evaluation and control device can initiate a re-determination of the actual sensor position or sensor location at regular intervals which can be predetermined or which can be set by the user.

Alternatively or additionally, it is possible for the evaluation and control device to trigger a determination of an actual spatial position, alignment and/or angular position of the sensor when the sensor has detected a new object in the monitored zone, for example has read in a barcode.

The evaluation and control device is preferably formed such that it can associate an object detection signal of the sensor to a spatial position or an angular position determined on the basis of the received position signals, for example in order to transmit a control signal associated with the object in question. In other words, a spatial position of the sensor determined once or at an actual moment in time should be able to be associated with an object which has been detected by the sensor. This mutual association of object information and of spatial information thus corresponds to a spatial link between the sensor and the object in question in order to be able to separate out that piece of baggage or shipped package which bears an identified barcode on the basis of this link, for example by means of a controlled actuator, with a high reliability.

In order to be able to determine the actual spatial position, alignment or angular position of the sensor as immediately as possible when necessary, in particular with mobile sensor applications, it is preferred for the position measuring device to determine the available position detection signals continuously on the basis of a corresponding control by the evaluation and control device and to forward them to the control and evaluation device.

It is furthermore preferred for the position measuring device and the associated evaluation and control device to be permanently integrated into the sensor. In particular, the evaluation and control device provided for the calculation of the spatial position, alignment or angular position of the sensor can be part of that evaluation and control device which is provided for the control of the light transmitter and of the light receiver as well as for the evaluation of the received light signals of the opto-electronic sensor. The sensor in accordance with the invention can thus be equipped with the position measuring device as standard in order—as explained—to be able to determine the spatial position or angular position of the sensor with respect to universal spatial coordinates or with respect to predetermined reference positions for the first taking into operation or regularly in application use.

The sensor in accordance with the invention can also have an image detection camera, in particular a camera for the detection of two-dimensional codes, for example, instead of a barcode reader or laser scanner.

The invention will be explained in the following by way of example with reference to the drawings.

DESCRIPTION OF THE PREFERRED EMBODIMENTS

Figure 1:
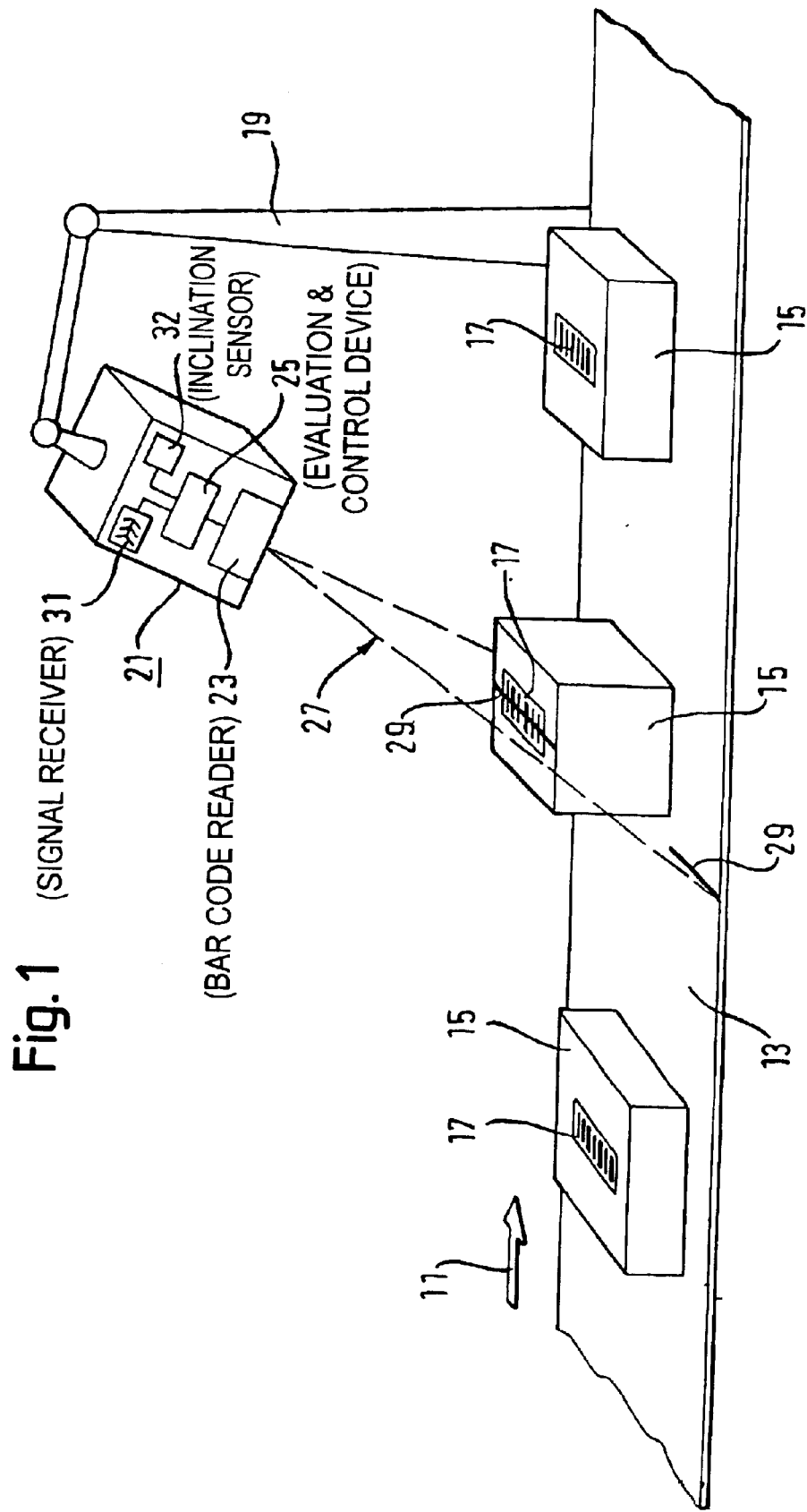
FIG. 1 shows an application of a sensor in accordance with the invention in a stationary operational arrangement.

FIG. 1 shows, in a schematic perspective view, a transport belt 13 moving along a transport direction 11 on whose upper side three shipped packages 15 are arranged. Each shipped package 15 bears a barcode 17.

A sensor 21, which has a barcode reader 23, is arranged—as is shown schematically in FIG. 1—above the transport belt 13 by means of a holder 19. The barcode reader 23 is equipped—in a manner known per se—with a laser diode as a light transmitter and with a rotating polygon mirror as well as with a photodiode as a light receiver. Furthermore, the sensor 21 has an evaluation and control device for the control of the barcode reader 23 and for the evaluation of the received light signals produced by the barcode reader 23.

The barcode reader 23 is controlled by the evaluation and control device 25 such that it periodically scans a fan-shaped monitored zone 27 by means of the transmitted laser beam. The laser beam appears at the transport belt 13 and at a shipped package 15 located thereon as a scan line 29.

In accordance with the invention, the sensor 21 is equipped with a position signal receiver 31 in the form of a radio antenna unit as well as with an inclination sensor 32 which are connected to the evaluation and control device 25. The position signal receiver 31 is capable of receiving the reference signals transmitted by a satellite-aided position signal transmission system, of amplifying them and of forwarding them as position detection signals to the evaluation and control device 25. The inclination sensor 32 transmits an additional position detection signal, which corresponds to the angular position of the sensor 21 with respect to the horizontal, to the evaluation and control device 25. The evaluation and control device 25 can calculate an absolute spatial position of the position signal receiver 31 in X, Y, Z coordinates, the alignment of the position signal receiver 31 as well as the angular position of the inclination sensor 32 with respect to the horizontal from these position detection signals such that the corresponding position data of the sensor 21 are known.

The sensor 21 can also derive the extent and the location of the monitored zone 27 and of the scan line 29 on the basis of these position data. The evaluation and control device 25 can thereby associate an object detection signal of the barcode reader 23, that is, for example, an identified and a read-in barcode 17, unambiguously with a spatial position along the transport belt 13, and thus with a shipped package 15. The shipped package 15 in question can therefore be subsequently sorted out in accordance with a sorting manner corresponding to the barcode 17 without any confusion arising between the shipped packages 15.

The explained spatial association between an object detection signal of the barcode reader 23 and a barcode 17, or of a shipped package 15, can be supported, for example, by incremental transducers which are not shown in FIG. 1 and which deliver a transport position signal representing the transport position or transport speed of the transport belt 13 to the evaluation and control device 25.

The explained embodiment of the sensor 21 with the position signal receiver 31, the inclination sensor 32 and the evaluation and control device 25 has the advantage that the spatial position and angular position of the sensor 21, and thus the relative position with respect to the transport belt 13 and to the shipped packages 15 and barcodes 17 located thereon, can be determined in a simple manner without a complex measurement of the sensor 21, of the monitored zone 27 and of the surrounding space being required for this purpose.

This advantageously simple position and location determination can be of particular significance if the sensor 21 should be moved—for example due to a corresponding design of the holder 19—into different spatial positions or angular positions for different applications. This can be desired, for example, if the transport belt 13 should be reconfigured or if the sensor 21 should monitor an adjacent transport belt at times.

In the case of such a position change or location change of the sensor 21, a spatial association of the monitored zone 2 and of the scan line 29 with the transport belt in question can again be established immediately without problem. For this purpose, the evaluation and control device 25 determines the new spatial position and angular position on the basis of position detection signals which are determined by means of the position signal receiver 31 and of the inclination sensor 32. The evaluation and control device 25 puts these data into relation with transport position data which represent the transport position of the transport belt 13 or the position of a shipped package 15 located thereon.

It must still be noted with respect to the embodiment in accordance with FIG. 1 that the position signal receiver 31 shown can be formed alternatively or additionally to the reception of reference signals of a satellite-aided transmission system for the reception of corresponding reference signals of a local position signal transmitter. Moreover, it is possible to provide at the sensor 21 only the shown position signal receiver 31 without an inclination sensor 32, or only the inclination sensor 32 without a position signal receiver.

Figure 2:
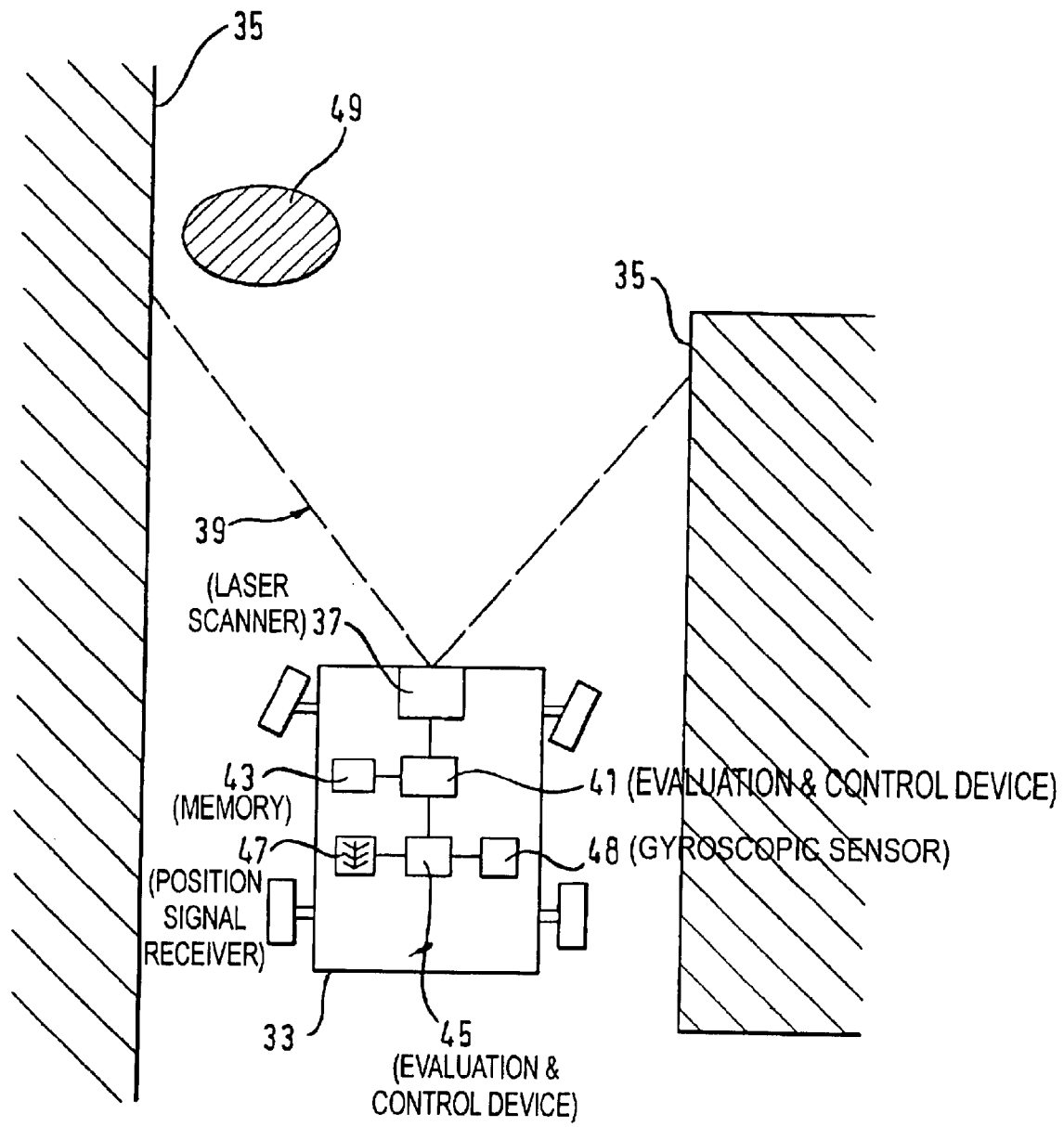
FIG. 2 shows an application of a sensor in accordance with the invention in a mobile arrangement.

FIG. 2 shows a further application of the sensor in accordance with the invention. A driver-less transport vehicle 33 is shown in a schematic plan view which moves along a corridor between two walls 35 of a warehouse. To allow a collision-free maneuvering, the transport vehicle 33 is equipped with a laser scanner 37 which scans the surroundings—in a known manner—along a monitored zone 27 in the direction of travel by means of a laser beam. The received signals thereby gained on the basis of the light reflection reproduce the actual angular position of the laser scanner and the distance of the respectively reflected object.

These received signals are evaluated by means of an evaluation and control device 41 in that the spatial information determined hereby is compared with a spatial data set which represents the plan and design of the warehouse and is stored in a memory device 43 connected to the evaluation and control device 41. The evaluation and control device 41 delivers an actual direction signal and acceleration/deceleration signal to a drive unit of the transport vehicle 33 (not shown in FIG. 2) on the basis of this comparison. By a constant scanning of the spatial data set stored in the memory device 43, the transport vehicle 33 can therefore maneuver safely through the warehouse.

In accordance with the invention, the laser scanner 37 is coupled via the evaluation and control device 41 to a further evaluation and control device 45 as well as to a position signal receiver 47, which is connected hereto, and to a gyroscopic sensor 48. The position signal receiver 47 continuously receives the reference signals of a plurality of local position signal transmitters (not shown) installed inside the warehouse and forwards corresponding position detection signals to the evaluation and control device 45. The gyroscopic sensor 48 continuously determines its actual alignment within the horizontal plane with respect to a reference alignment determined once and it delivers a corresponding position detection signal to the evaluation and control device 45. This calculates the actual spatial position and alignment of the transport vehicle 33 with respect to the stored spatial data set from these relative position data. This information is forwarded to the evaluation and control device 41 of the laser scanner 37 so that it can check for control purposes whether the actual position of the transport vehicle 33 was correctly determined on the basis of the data of the laser scanner 37 and of the memory device 43.

This additional control possibility proves to be particularly advantageous, for example, when an obstacle 49—for example a supervisor—is detected in the monitored zone 39 which is only temporarily located in the warehouse and accordingly is not recorded in the spatial data set stored in the memory device 43. Whereas such an obstacle 49 can result in a loss of orientation of the transport vehicle 33 under unfavorable circumstances, this danger can be reduced in that additional data on the actual spatial position are made available for comparison purposes on the basis of the position signal receiver 47 coupled to the laser scanner 37.

It must still be remarked with respect to the embodiment in accordance with FIG. 2 that, alternatively or additionally to the explained position signal receiver 47, such a receiver can also be provided which receives the reference signals of a satellite-aided position signal transmission system. Furthermore, the gyroscopic sensor 48 is not absolutely necessary. It is also possible to provide only the gyroscopic sensor 48 for the determination of the actual alignment of the transport vehicle 33, with the position signal receiver 47 being dispensed with.

What is claimed is:

1. An opto-electronic sensor comprising a code reader for the optical detection of a barcode or a two-dimensional optical code and for the production of corresponding light reception signals, a position measuring device which comprises at least one of an alignment sensor for the production of at least one position detection signal which corresponds to an actual alignment of the opto-electronic sensor and an inclination sensor for the production of at least one position detection signal which corresponds to an actual angular position of the opto-electronic sensor, an evaluation and control device, and a holder for holding the opto-electronic sensor in a stationary arrangement, wherein the evaluation and control device identifies a detected code on the basis of the light reception signals of the code reader, calculates an actual angular position of the opto-electronic sensor using the at least one position detection signal of the position measuring device, and associates the identified code with the calculated angular position.

2. A sensor in accordance with claim 1 wherein the position measuring device includes a gyroscopic sensor for producing at least one position detection signal which corresponds to an actual alignment of the sensor.

3. A sensor in accordance with claim 1 wherein the inclination sensor comprises a static acceleration sensor.

4. A sensor in accordance with claim 1 wherein the evaluation and control device causes the inclination sensor to determine an actual angular position, alignment and/or angular position of the opto-electronic sensor.

5. A sensor in accordance with claim 1 wherein the evaluation and control device causes the inclination sensor to determine an actual angular position, alignment and/or angular position of the opto-electronic sensor in response to at least one of a trigger command given by a user;
taking the sensor into operation;
predetermined time intervals; and
the result of a previous object detection.

6. A sensor in accordance with claim 1 wherein the position measuring device is controlled by the evaluation and control device for continuously producing position detection signals.

7. A sensor in accordance with claim 1 wherein at least one of the position measuring device and the evaluation and control device is integrated into the sensor.

8. A sensor in accordance with claim 1 wherein the sensor comprises a light transmitter for the transmission of a transmitted light beam and a light receiver for the producing received light signals in dependence on an incidence of light, and wherein the evaluation and control device controls the light transmitter, the light receiver, and the evaluation of the received light signals.

9. A stationary position detecting arrangement comprising an optoelectronic sensor including a code reader for the optical detection of a barcode or a two-dimensional optical code and for producing corresponding light reception signals, a position measuring device which comprises at least one of an alignment sensor for the production of at least one position detection signal which corresponds to an actual alignment of the opto-electronic sensor and an inclination sensor for the production of at least one position detection signal which corresponds to an actual angular position of the opto-electronic sensor, an evaluation and control device, and a holder for holding the opto-electronic sensor in the stationary arrangement, wherein the evaluation and control device identifies a detected code on the basis of the light reception signals of the code reader, calculates an actual angular position of the opto-electronic sensor using the at least one position detection signal of the position measuring device, and associates the identified code with the calculated angular position.

10. A stationary position detecting arrangement in accordance with claim 9 wherein the opto-electronic sensor is stationarily installed in an omni-directional reading station.

11. An arrangement in accordance with claim 9 wherein the position measuring device includes a gyroscopic sensor for producing at least one position detection signal which corresponds to an actual alignment of the sensor.

12. An arrangement in accordance with claim 9 wherein the inclination sensor comprises a static acceleration sensor.

13. An arrangement in accordance with claim 9 wherein the evaluation and control device causes the inclination sensor to determine an actual angular position, alignment and/or angular position of the opto-electronic sensor.

14. An arrangement in accordance with claim 9 wherein the evaluation and control device causes the inclination sensor to determine an actual angular position, alignment and/or angular position of the opto-electronic sensor in response to at least one of a trigger command given by a user;

taking the sensor into operation;

predetermined time intervals; and the result of a previous object detection.

15. An arrangement in accordance with claim 9 wherein the position measuring device is controlled by the evaluation and control device for continuously producing position detection signals.

16. An arrangement in accordance with claim 9 wherein at least one of the position measuring device and the evaluation and control device is integrated into the sensor.

17. An arrangement in accordance with claim 9 wherein the sensor comprises a light transmitter for the transmission of a transmitted light beam and a light receiver for the producing received light signals in dependence on an incidence of light, and wherein the evaluation and control device controls the light transmitter, the light receiver, and the evaluation of the received light signals.

18. An opto-electronic sensor system comprising at least one earth-bound local position signal transmitter for the transmission of reference signals and an opto-electronic sensor for optically detecting an object within a monitored zone and for producing corresponding light reception signals, the opto-electronic sensor being coupled to a position measuring device which comprises a position signal receiver for the reception of reference signals of the at least one local position signal transmitter and which produces at least one corresponding position detection signal, the opto-electronic sensor further being coupled to an evaluation and control device, wherein the evaluation and control device produces an object detection signal on the basis of the light reception signals of the opto-electronic sensor, calculates an actual spatial position of the opto-electronic sensor using the at least one position detection signal of the position measuring device, and associates the object detection signal with the calculated spatial position.

19. A system in accordance with claim 18 wherein the position measuring device includes a position signal receiver for the reception of reference signals of a satellite-aided position signal transmission system.

20. A system in accordance with claim 19 wherein the satellite-aided position signal transmission system is one of a GPS global positioning system and a Galileo satellite navigation system.

21. A system in accordance with claim 18 wherein the position measuring device includes a gyroscopic sensor for producing at least one position detection signal which corresponds to an actual alignment of the sensor.

22. A system in accordance with claim 18 wherein the position measuring device includes an inclination sensor for producing at least one position detection signal which corresponds to an actual angular position of the sensor.

23. A system in accordance with claim 18 wherein the evaluation and control device causes the inclination sensor to determine an actual angular position, alignment and/or angular position of the opto-electronic sensor.

24. A system in accordance with claim 18 wherein the evaluation and control device causes the inclination sensor to determine an actual angular position, alignment and/or angular position of the opto-electronic sensor in response to at least one of a trigger command given by a user;

taking the sensor into operation;

predetermined time intervals; and the result of a previous object detection.

25. A system in accordance with claim 18 wherein the position measuring device is controlled by the evaluation and control device for continuously producing position detection signals.

26. A system in accordance with claim 18 wherein at least one of the position measuring device and the evaluation and control device is integrated into the sensor.

27. A system in accordance with claim 18 wherein the sensor includes a barcode reader, a camera or a laser scanner.

28. A system in accordance with claim 18 wherein the sensor is provided for operation in a stationary arrangement.

29. A system in accordance with claim 18 wherein the sensor is adapted for operation in a mobile arrangement.

30. A system in accordance with claim 18 wherein the sensor comprises a light transmitter for the transmission of a transmitted light beam and a light receiver for producing received light signals in dependence on an incidence of light, and wherein the evaluation and control device controls the light transmitter, the light receiver, and the evaluation of the received light signals.

\* \* \* \* \*